Feb. 11, 1930.           H. H. MORETON           1,746,735
                      SPOTLIGHT ATTACHMENT
                       Filed Jan. 10, 1928
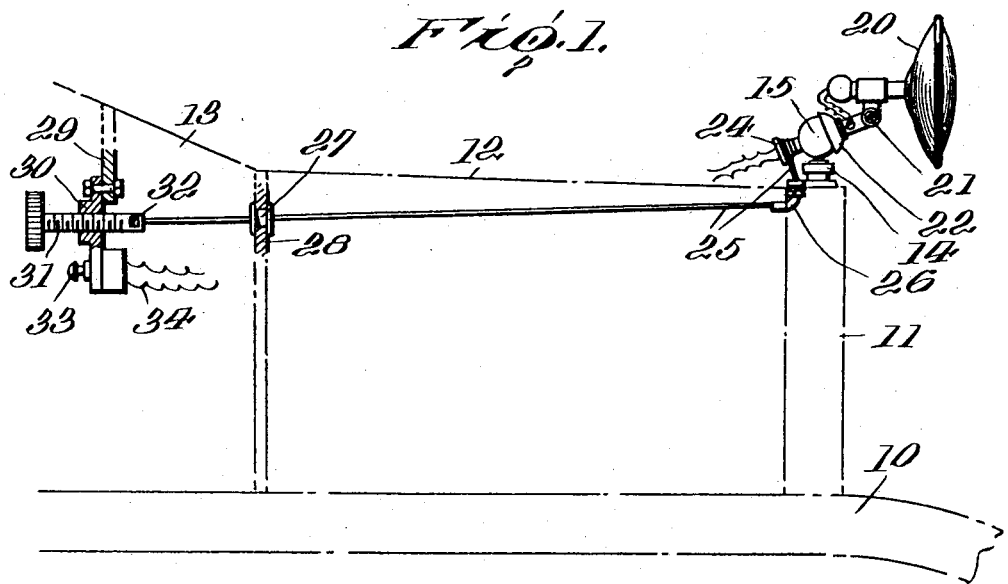
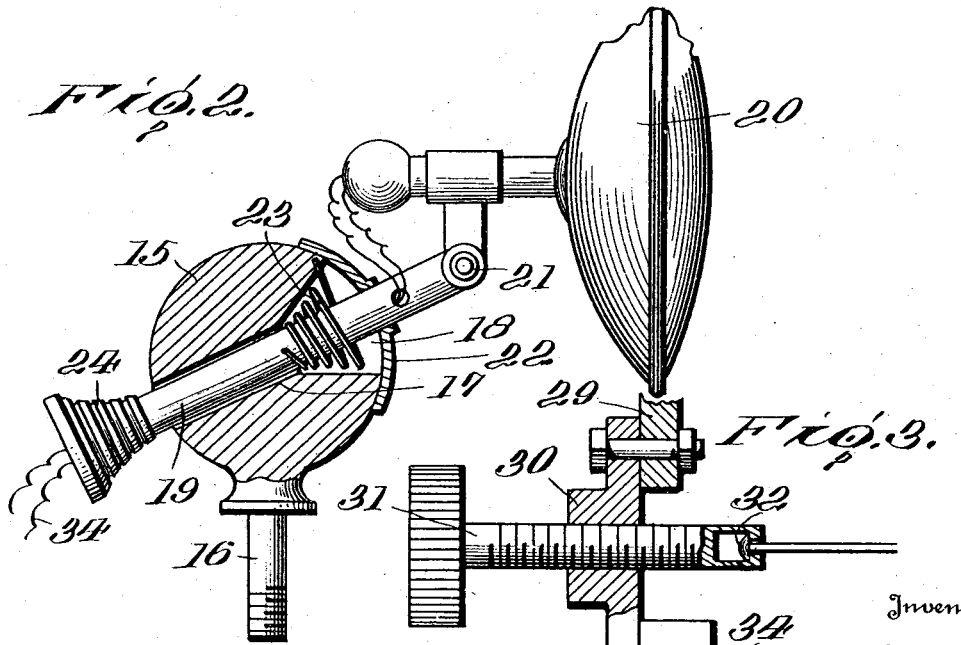
Inventor
Henry H. Moreton
By
Attorney Patented Feb. 11, 1930

1,746,735

UNITED STATES PATENT OFFICE

HENRY H. MORETON, OF STONY POINT, NEW YORK

SPOTLIGHT ATTACHMENT

Application filed January 10, 1928. Serial No. 245,697.

This invention is an illuminating attachment for motor vehicles and the like.

One of the objects of the invention is to provide a headlight or spotlight attachment capable of having its beam directed in various angular directions with respect to the direction of travel of the vehicle, so as to illuminate the roadway, sign posts, street numbers and the like. A further object is to provide means by which the lamp may be supported on the front end of a vehicle, and yet be manipulated from a position contiguous to the driver's seat. A further object is to provide simple means by which the angular positions of the lamp may be varied at will and the lamp retained in any desired angular adjustment.

The invention will be hereinafter fully set forth and particularly pointed out in the claims.

In the accompanying drawing:—

Figure 1 is a diagrammatic side elevation illustrating a motor vehicle with the invention applied thereto. Figure 2 is an enlarged sectional view of the lamp support. Figure 3 is an enlarged view illustrating the lamp adjusting device.

Referring to the drawing, 10 designates the side bars of the chassis of a motor vehicle, 11 the radiator, 12 the hood, and 13 the cowl. These elements are parts of standard construction and are not illustrated in detail.

Suitably mounted upon the vehicle at any desired position, but preferably as a closure for the filling opening 14 of the radiator, is a support member 15, which is illustrated as of approximately spherical form, provided with a depending stem 16 by means of which it may be secured to the radiator cap. The support member 15 is provided with an inclined bore 17, which is enlarged to form a chamber 18 at the forward end. Extending through the bore 17 and rotatably mounted therein, is a tubular carrier shaft 19. A tubular collar is pivotally connected to the forward end of the shaft, as indicated at 21, said collar engaging and supporting a rearwardly extended shank of the spotlight or other lamp 20. The pivotal connection 21 is controlled by a thumb nut which permits of any desired angular adjustment of the lamp 20 with respect to the axis of the shaft 17. The open end of the chamber 15 is closed by a cap 22 secured to the shaft. Said shaft is encircled by a spring 23, one end of which is secured to the shaft and the other end secured to the support member 15. The spring is so arranged that when under tension it tends to rotate the shaft 19 in one direction.

Secured to the inner end of the shaft 17 is a grooved enlargement 24 around which is wound a cable 25. Said cable extends through a tubular guide 26 mounted in the radiator, and is carried through a guide 27 supported by the dash 28, as shown. Supported by the cowl 13 in suitable manner, as by a bracket 29, is an adjuster plate 30, having a threaded opening in which is adjustably mounted the threaded shank of an adjuster screw 31. Said screw is provided with a coarse or quick thread, and is connected at one end to the cable 25 by means of a swivel 32, the other end being provided with a convenient form of operating handle or knob.

If desired, the plate 30 may also support a switch 33 connected to the cable 34, which leads from the lamp 20 and through the shaft 19.

In practice, the shaft 19 is rotated to place the spring 23 under sufficient tension to reverse the rotation of the shaft if not prevented. The cable 25 is then wound upon the enlargement 24 in a direction that will prevent rotation of the shaft 19 under the reaction of said spring 23 as long as a pulling tension is maintained upon said cable. This pulling tension is maintained by connecting the cable with the adjuster screw 31, and adjusting the latter to a position which will hold the cable taut.

In operation, the shaft 19 is adjusted so as to normally direct the lamp straight ahead, but when it is desired to direct the lamp to either side for the purpose of reading a sign post, a street number or the like, the screw 31 is rotated in the adjuster plate 30 in a manner to exert a pull upon the cable 25 or to pay out said cable, according to the direction to which it is desired to turn the lamp. This will cause the cable to unwind or wind upon the enlargement 24 and at the same time a corresponding rotation is imparted to the shaft 19. It will be understood that rotation of the shaft 19 in one direction tends to wind the spring 23 around the shaft and to increase its tension, so that when the pull upon the cable 25 is relieved, the reaction of the spring will reverse the direction of rotation of the shaft 19. The release of tension upon the cable is accomplished by reversing the rotation of the screw shaft 31, and it will be readily understood that as the cable is payed out by reason of said adjustment of screw 31, it will be wound upon the enlargement 24. As the shaft 19 is rotated in either direction, the lamp carrier is caused to travel in an arcuate path with respect to the axis of the shaft, and the lamp 20 being disposed at an angle to said axis, its beam will be projected laterally and upwardly or downwardly, the direction being determined by the direction of rotation of the shaft 19.

The advantages of the invention will be readily understood by those skilled in the art to which it belongs. It will be particularly noted that the lamp may be adjusted to project its beam in any direction either forwardly or laterally, at the will of the driver and that movements thereof are controlled from a position contiguous to the driver's seat. It will be also noted that at whatever position the lamp may be brought by a manipulation of the actuating screw in one direction, the spring always tends to bring it back in the opposite direction just as soon as said screw is adjusted in the reverse direction, and that the distance to which the lamp will return will depend solely upon the extent of slackening or reduction of the pull upon the cable.

Having thus explained the nature of the invention and described an operative manner of constructing and using the same, although without attempting to set forth all of the forms in which it may be made, or all of the forms of its use, what is claimed is:—

1. A spotlight attachment comprising a support, a carrier shaft rotatably mounted in said support in an inclined position with its front end higher than its rear end, means normally acting on said shaft tending to rotate it in a predetermined direction, means for rotating said shaft in opposition to the rotating tendency of the first-mentioned means, and a lamp carried by the higher end of the carrier shaft and maintained in a normally fixed position with respect to said shaft, so that by rotating the shaft the beam of said lamp may be caused to project laterally and upwardly or downwardly.

2. A spotlight attachment comprising a support, a carrier shaft rotatably mounted in said support in an inclined position with its front end higher than its rear end, a spring normally acting to rotate said shaft in one direction, means for rotating said shaft in opposition to the rotating tendency of said spring, and a lamp carried by the higher end of the carrier shaft and maintained in a normally fixed position with respect to said shaft so that by rotating said shaft the beam of said lamp may be caused to project laterally and upwardly or downwardly.

3. A spotlight attachment comprising a support, a carrier shaft rotatably mounted in said support and in an inclined position with its front end higher than its rear end, means normally acting on said shaft tending to rotate it in a predetermined direction, a lamp carried by the higher end of the shaft, means for adjustably varying the angle of the lamp with respect to said shaft, means engaging the other end of the shaft for rotating it in opposition to the rotating tendency of the first-mentioned means, said rotatable means being controllable at a position distant from said carrier shaft, the parts being so positioned that by rotating the shaft the beam of said lamp may be caused to project laterally and upwardly or downwardly.

4. A spotlight attachment comprising a supporting member, a carrier shaft rotatably mounted in said member in an inclined position with its front end higher than its rear end, a spring encircling said shaft and having one end secured to the supporting member and the other end to said shaft, a lamp mounted on the higher end of said shaft, means engaging the lower end of said shaft for imparting rotation thereto in opposition to the tension of said spring.

5. A spotlight attachment of the character described comprising a support, a shaft rotatably mounted in said support, in an inclined position with its front end higher than its rear end, means tending to rotate said shaft in one direction, a lamp carried by the higher end of the carrier shaft, a cable having a portion wrapped around the low end of said shaft, and means for applying a pulling force to said cable so as to rotate the shaft in opposition to the first-mentioned moving means and to also maintain a tension on said spring.

6. A spotlight attachment of the character described comprising a support, a carrier shaft mounted in said support in an inclined position with its front end higher than its rear end, means tending to rotate said shaft in one direction, a lamp secured to the high end of said shaft, a cable having a portion wrapped around the low end of said shaft, an adjustably supported screw-threaded actuator, and means connecting said actuator with said cable so that a graduated rotative tension may be maintained upon said shaft.

7. A spotlight attachment of the character described comprising a support, a carrier shaft rotatably mounted in said support in an inclined position with its front end higher than its rear end, a spring encircling said shaft and having one end secured to the shaft and the other end secured to the support, a lamp on the high end of said shaft and an enlargement on the low end of said shaft, a cable wrapped around said enlargement so as to impart rotation to the shaft in opposition to the tension of the spring, and means connected with said cable by which the tension thereon may be increased or diminished to effect rotations of said shaft.

8. A spotlight of the character described comprising a support, a hollow carrier shaft rotatably mounted in said support in an inclined position with its front end higher than its rear end, a lamp mounted on the higher end of said shaft, tension means acting to normally rotate the shaft in one direction, means for rotating the shaft in opposition to the tension of the first-mentioned rotative means, and a cable for the lamp passing through the bore of said shaft.

In testimony whereof I have hereunto set my hand.

HENRY H. MORETON.